United States Patent
Nishikawa et al.

(10) Patent No.: US 11,315,572 B2
(45) Date of Patent: Apr. 26, 2022

(54) SPEECH RECOGNITION DEVICE, SPEECH RECOGNITION METHOD, AND RECORDING MEDIUM

(71) Applicant: Panasonic Corporation, Osaka (JP)

(72) Inventors: Tsuyoki Nishikawa, Osaka (JP); Hiroki Furukawa, Osaka (JP); Atsushi Sakaguchi, Kyoto (JP)

(73) Assignee: PANASONIC CORPORATION, Osaka (JP)

( * ) Notice: Subject to any disclaimer, the term of this patent is extended or adjusted under 35 U.S.C. 154(b) by 47 days.

(21) Appl. No.: 16/826,899

(22) Filed: Mar. 23, 2020

(65) Prior Publication Data

US 2020/0312332 A1 Oct. 1, 2020

Related U.S. Application Data

(60) Provisional application No. 62/824,641, filed on Mar. 27, 2019.

(30) Foreign Application Priority Data

Oct. 30, 2019 (JP) .............................. JP2019-197289

(51) Int. Cl.
*G10L 17/00* (2013.01)
*G10L 17/02* (2013.01)

(52) U.S. Cl.
CPC .............. *G10L 17/00* (2013.01); *G10L 17/02* (2013.01)

(58) Field of Classification Search
CPC ......... G10L 17/00; G10L 17/04; G06F 3/167; G06F 3/162; G06F 3/165
See application file for complete search history.

(56) References Cited

U.S. PATENT DOCUMENTS

| | | | |
|---|---|---|---|
| 8,588,849 B2* | 11/2013 | Patterson | H04W 4/20 455/557 |
| 10,079,024 B1* | 9/2018 | Bhimanaik | G10L 17/06 |
| 10,388,120 B2* | 8/2019 | Muhsin | G06F 3/167 |
| 10,796,687 B2* | 10/2020 | Leblang | G10L 15/065 |
| 2012/0253807 A1* | 10/2012 | Kamano | G10L 25/63 704/240 |

(Continued)

FOREIGN PATENT DOCUMENTS

JP 5375423 12/2013

*Primary Examiner* — Jakieda R Jackson
(74) *Attorney, Agent, or Firm* — Wenderoth, Lind & Ponack, L.L.P.

(57) ABSTRACT

A speech recognition device includes: an obtaining unit which obtains a speech uttered in a conversation between a first speaker and a second speaker; a storage which stores the speech obtained; an input unit which receives operation input; an utterance start detector which, when the input unit receives the operation input, detects a start position of the speech; and a speaker identification unit which identifies a speaker of the speech as the first speaker who has performed the operation input or the second speaker who has not performed the operation input, based on (i) first timing at which the input unit has received the operation input and (ii) second timing indicating the detected start position of the speech. The first and second timing are set for each speech of the first and second speakers. A speech recognizer performs speech recognition on the speech whose speaker has been identified.

10 Claims, 8 Drawing Sheets

(56) References Cited

U.S. PATENT DOCUMENTS

| | | | |
|---|---|---|---|
| 2013/0173266 A1* | 7/2013 | Nishino | G10L 25/51 704/236 |
| 2015/0154957 A1* | 6/2015 | Nakadai | G06F 40/58 704/235 |
| 2015/0169551 A1* | 6/2015 | Yun | G06F 3/04886 704/2 |
| 2015/0370531 A1* | 12/2015 | Faaborg | G10L 15/30 704/275 |
| 2017/0090864 A1* | 3/2017 | Jorgovanovic | G10L 21/0332 |
| 2019/0013019 A1* | 1/2019 | Lawrence | G06F 3/167 |
| 2019/0306401 A1* | 10/2019 | Toriumi | H04N 1/00403 |
| 2020/0103964 A1* | 4/2020 | Tanaka | G01C 21/3697 |
| 2020/0184964 A1* | 6/2020 | Myers | G10L 15/22 |
| 2020/0388285 A1* | 12/2020 | Spiewla | G06F 3/167 |

\* cited by examiner

SPEECH RECOGNITION DEVICE, SPEECH RECOGNITION METHOD, AND RECORDING MEDIUM

CROSS REFERENCE TO RELATED APPLICATIONS

The present application is based on and claims priority of U.S. Provisional Patent Application No. 62/824,641 filed on Mar. 27, 2019 and Japanese Patent Application No. 2019-197289 filed on Oct. 30, 2019. The entire disclosures of the above-identified applications, including the specifications, drawings and claims are incorporated herein by reference in their entirety.

FIELD

One or more exemplary embodiments disclosed herein relate generally to a speech recognition device, a speech recognition method, and a recording medium.

BACKGROUND

Patent Literature (PTL) 1, for example, discloses a speech recognition system including: an utterance timing indication obtaining means for obtaining user's indication of utterance timing; a speech signal holding means which holds an input speech signal, and which outputs the held speech signal and speech signals which are input after the speech signal, when indication to start utterance of speech is obtained by the utterance timing indication obtaining means; an utterance section detecting means for detecting an utterance section from the speech signal output by the speech signal holding means; and an incorrect operation detecting means for detecting user's incorrect operation by comparing time information of the utterance section with the presence/absence and time information of the indication of utterance timing.

This speech recognition system can detect user's incorrect operation and notify the user of the incorrect operation detected.

CITATION LIST

Patent Literature

PTL 1: Japanese Patent No. 5375423

SUMMARY

Technical Problem

With the technique disclosed in PTL 1, however, when, for example, a first speaker is the owner of the speech recognition system, the first speaker knows how to use the speech recognition system he or she owns, and thus can properly operate the speech recognition system to make the speech recognition system recognize his or her speech. Therefore, the first speaker can make the speech recognition system recognize his or her speech from beginning to end. However, a second speaker, who is the conversation partner of the first speaker, does not know how to use the speech recognition system, and thus the first speaker cannot recognize the timing at which the second speaker would utter a speech. As a consequence, it is difficult for the first speaker to make the speech recognition system recognize a speech of the second speaker from beginning to end. This inhibits adequate speech recognition on the speech of the second speaker, thereby necessitating the first speaker to ask the second speaker to speak again.

The present disclosure has been conceived in view of the above circumstances, and one non-limiting and exemplary embodiment provides a speech recognition device, a speech recognition method, and a recording medium capable of reliably obtaining and recognizing a speech of a conversation partner.

Solution to Problem

A speech recognition device according to an aspect of the present disclosure is a speech recognition device for a conversation between a first speaker and at least one second speaker who is a conversation partner of the first speaker, the speech recognition device including: an obtaining unit which obtains a speech uttered in the conversation between the first speaker and the at least one second speaker; a storage which stores the speech uttered in the conversation between the first speaker and the at least one second speaker and obtained by the obtaining unit; an input unit which receives operation input from at least the first speaker; an utterance start detector which, in response to the operation input received by the input unit, detects a start position of the speech stored in the storage, the start position being a position at which utterance of the speech has started; and a speaker identification unit which identifies a speaker of the speech as one of the first speaker who has performed the operation input on the input unit and the at least one second speaker who has not performed the operation input on the input unit, based on first timing and second timing which are set for each of speeches uttered in the conversation between the first speaker and the at least one second speaker, the first timing being timing at which the input unit has received the operation input, the second timing being timing which indicates the start position of the speech detected by the utterance start detector, wherein speech recognition is performed on the speech uttered by the one of the first speaker and the at least one second speaker identified by the speaker identification unit, the speech recognition being performed by a speech recognizer from the start position of the speech.

Note that some of general and specific aspects described above may be implemented using a system, a method, an integrated circuit, a computer program, or a computer-readable recording medium such as a CD-ROM (compact disc read-only memory), or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The speech recognition device and the related technologies according to one or more exemplary embodiments or features disclosed herein can reliably obtain and recognize a speech of a conversation partner.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1A:
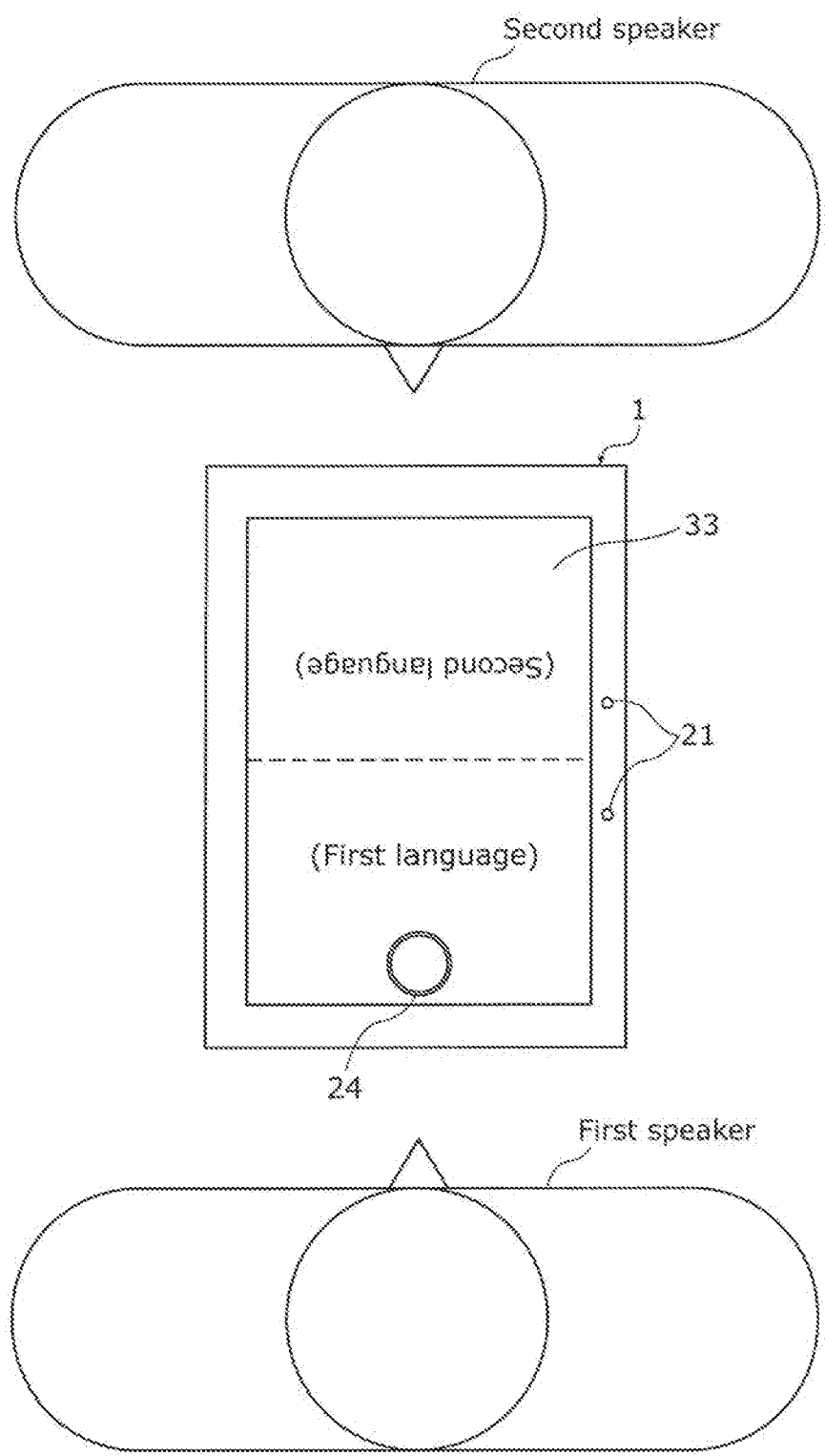
FIG. 1A illustrates an example of the external appearance of a speech translation apparatus including a speech recognition device according to Embodiment 1, and an example of a scene where the speech translation apparatus is used by a first speaker and a second speaker.

A speech recognition device according to an aspect of the present disclosure is a speech recognition device for a conversation between a first speaker and at least one second speaker who is a conversation partner of the first speaker, the speech recognition device including: an obtaining unit which obtains a speech uttered in the conversation between the first speaker and the at least one second speaker; a storage which stores the speech uttered in the conversation between the first speaker and the at least one second speaker and obtained by the obtaining unit; an input unit which receives operation input from at least the first speaker; an utterance start detector which, in response to the operation input received by the input unit, detects a start position of the speech stored in the storage, the start position being a position at which utterance of the speech has started; and a speaker identification unit which identifies a speaker of the speech as one of the first speaker who has performed the operation input on the input unit and the at least one second speaker who has not performed the operation input on the input unit, based on first timing and second timing which are set for each of speeches uttered in the conversation between the first speaker and the at least one second speaker, the first timing being timing at which the input unit has received the operation input, the second timing being timing which indicates the start position of the speech detected by the utterance start detector, wherein speech recognition is performed on the speech uttered by the one of the first speaker and the at least one second speaker identified by the speaker identification unit, the speech recognition being performed by a speech recognizer from the start position of the speech.

In view of the above, according to the present disclosure, since a speech uttered in the conversation between the first speaker and at least one second speaker is stored in the storage, it is possible to identify the speaker of the stored speech as either the first speaker or a second speaker. This enables the speech recognizer to read, from the storage, the speech of either the first speaker or the at least one second speaker identified, and perform speech recognition on the speech which has been read. That is to say, if the first speaker utters a speech after the first speaker performs operation input on the input unit, the speech recognizer can perform speech recognition on the speech of the first speaker. Moreover, since the second speaker usually starts to utter a speech after the first speaker has finished uttering a speech, the speech recognizer can perform speech recognition on the speech of the second speaker with a trigger of the first speaker performing operation input on the input unit in response to the second speaker starting a speech.

Accordingly, by reliably obtaining a speech of a conversation partner, the speech recognition device can perform speech recognition on the speech of the conversation partner.

A speech recognition method according to another aspect of the present disclosure is a speech recognition method for a conversation between a first speaker and at least one second speaker who is a conversation partner of the first speaker, the speech recognition method including: obtaining a speech uttered in the conversation between the first speaker and the at least one second speaker; storing, in a storage, the speech uttered in the conversation between the first speaker and the at least one second speaker and obtained; receiving, by an input unit, operation input from at least the first speaker; detecting, in response to the operation input received by the input unit, a start position the speech stored in the storage, the start position being a position at which utterance of the speech has started; identifying a speaker of the speech as one of the first speaker who has performed the operation input on the input unit and the at least one second speaker who has not performed the operation input on the input unit, based on first timing and second timing which are set for each of speeches uttered in the conversation between the first speaker and the at least one second speaker, the first timing being timing at which the input unit has received the operation input, the second timing being timing which indicates the start position of the speech detected; and performing speech recognition on the speech of the one of the first speaker and the at least one second speaker identified, the speech recognition being performed from the start position of the speech.

This speech recognition method yields the same advantageous effects as those of the speech recognition device described above.

A recording medium according to another aspect of the present disclosure is a non-transitory computer-readable recording medium for use in a computer, the recording medium having a computer program recorded thereon for causing the computer to execute the speech recognition method.

This recording medium yields the same advantageous effects as those of the speech recognition device described above.

In the speech recognition device according to another aspect of the present disclosure, the speaker identification unit: compares the first timing and the second timing which are set for each speech uttered in the conversation between the first speaker and the at least one second speaker; identifies the speaker of the speech as the first speaker from the first speaker and the at least one second speaker when the first timing is earlier than the second timing; and identifies the speaker of the speech as the at least one second speaker from the first speaker and the at least one second speaker when the second timing is earlier than the first timing.

Accordingly, when, for example, the first speaker is the owner of the speech recognition device, the first speaker knows how to use the speech recognition device that he or she owns, and thus starts to utter a speech after performing operation input on the input unit. In other words, the first timing at which the input unit receives the operation input from the first speaker is earlier than the second timing at which the first speaker starts to utter a speech, and thus, the speaker identification unit can identify the speaker of the speech as the first speaker from the first speaker and at least one second speaker. Since the first speaker cannot recognize the timing at which the second speaker would utter a speech, the first speaker performs operation input on the input unit when the second speaker starts to utter a speech. In other words, the first timing at which the input unit receives the operation input from the first speaker is later than the second timing at which the second speaker starts to utter a speech, and thus, the speaker identification unit can identify the speaker of the speech as the second speaker from the first speaker and at least one second speaker.

In such a manner, the speaker identification unit can accurately identify the speaker of a speech uttered at timing closest to the first timing as the first speaker or the second speaker. As such, since the speech recognition device can more reliably obtain a speech of the second speaker, it is possible to perform speech recognition on the speech of the second speaker.

In the speech recognition device according to another aspect of the present disclosure, when the speaker of the speech is identified as the first speaker from the first speaker and the at least one second speaker, the speech recognizer performs the speech recognition on the speech of the first speaker, and when the speaker of the speech is identified as a second speaker from the first speaker and the at least one second speaker, the speech recognizer performs the speech recognition on the speech of the second speaker.

Accordingly, since the speaker identification unit identifies the speaker of the speech as the first speaker or the second speaker, the speech recognizer can more reliably perform speech recognition on each speech of the first speaker and the second speaker.

In the speech recognition device according to another aspect of the present disclosure, the speaker identification unit identifies the speaker as one of the first speaker and the at least one second speaker, for each speech uttered in the conversation between the first speaker and the at least one second speaker in a specified period before or after the first timing at which the input unit has received the operation input.

Accordingly, it is possible to provide specified periods with the first timing serving as the reference point, in order to identify the speaker as the first speaker or the second speaker. This makes it possible to identify, as the first speaker or the second speaker, the speaker of the most recent speech uttered in a specified period ending at the first timing at which the first speaker performs operation input or in a specified period starting at the first timing. This makes it possible to recognize the speech of the first speaker and the speech of the second speaker individually. As a result, the speech recognition device can accurately identify the speaker of a speech as the first speaker or the second speaker.

In the speech recognition device according to another aspect of the present disclosure, upon finish of the speech recognition on a speech of the first speaker who has performed the operation input on the input unit, the storage starts to store a speech obtained by the obtaining unit, to store a speech of the at least one second speaker.

Usually, after the utterance of the speech of the first speaker, the second speaker starts uttering a speech when the second speaker understood the content of the speech of the first speaker. Upon finish of the speech recognition on the speech of the first speaker, recording starts before the second speaker starts uttering a speech, and therefore, the storage can reliably store the speech of the second speaker. Moreover, the speech recognition device can suspend the storage of a speech during a time period from when at least the first speaker has finished utterance of a speech until when the storage starts recording. This makes it possible to reduce consumption of power by the speech recognition device for storing a speech in the storage.

The speech recognition device according to another aspect of the present disclosure includes a communication unit configured to communicate with a cloud server which includes the speech recognizer, and the communication unit transmits, to the cloud server, the speech of the one of the first speaker and the at least one second speaker identified by the speaker identification unit, and receives a result of the speech recognition that the speech recognizer included in the cloud server has performed on the speech from the start position of the speech.

Accordingly, since it is the cloud server that performs speech recognition on the speech of the first speaker and the speech of at least one second speaker, it is possible to reduce the processing load on the speech recognition device.

The speech recognition device according to another aspect of the present disclosure includes the speech recognizer which performs the speech recognition on the speech of the one of the first speaker and the at least one second speaker identified by the speaker identification unit, the speech recognition being performed from the start position of the speech.

Accordingly, since it is the speech recognition device that performs speech recognition, there is no need to transmit a speech to an external cloud server, and therefore, it is possible to reduce an increase in the volume of communication between the speech recognition device and the cloud server.

In the speech recognition device according to another aspect of the present disclosure, the input unit is one operation button provided to the speech recognition device.

Accordingly, the first speaker can easily operate the speech recognition device.

In the speech recognition device according to another aspect of the present disclosure, the input unit receives the operation input from the first speaker for every speech of the first speaker and for every speech of the at least one second speaker.

Accordingly, by avoiding as much as possible the second speaker from performing operation input, and by instead having the first speaker take the initiative in performing operation input on the speech recognition device, it is possible to reliably identify the speaker of a speech as one of the first speaker and the second speaker.

Note that some of general or specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Each of the exemplary embodiments described below shows a specific example of the present disclosure. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as optional structural elements. Moreover, the exemplary embodiments may be combined.

Hereinafter, a speech recognition device, a speech recognition method, and a recording medium according to an aspect of the present disclosure will be described in greater detail with reference to the accompanying Drawings.

Embodiment 1

<Configuration of Speech Translation Apparatus 1>

FIG. 1A illustrates an example of the external appearance of speech translation apparatus 1 including speech recognition device 10 according to Embodiment 1, and an example of a scene where speech translation apparatus 1 is used by a first speaker and a second speaker.

As illustrated in FIG. 1A, speech translation apparatus 1 recognizes a conversation between the first speaker who speaks a first language and at least one second speaker who speaks a second language, and translates the recognized conversation in both directions. That is to say, speech translation apparatus 1 recognizes speeches uttered by the first speaker and at least one second speaker in two different languages, and translates the content of each of the speeches recognized into the language that the other party speaks. The first language is different from the second language. The first language and the second language are Japanese, English, French, German, Chinese, etc. The present embodiment illustrates an example where one first speaker and one second speaker have a face-to-face conversation.

In the present embodiment, the first speaker is the owner of speech translation apparatus 1, and it is mainly the first speaker who performs operation input on speech translation apparatus 1. In other words, the first speaker is the user of speech translation apparatus 1 who knows how to operate speech translation apparatus 1.

In the present embodiment, speech translation apparatus 1 recognizes a speech of the first speaker in the first language in response to the first speaker performing operation input on speech translation apparatus 1 before the first speaker utters a speech. Upon recognition of the speech of the first speaker in the first language, speech translation apparatus 1: displays the recognized speech in first text (characters) in the first language; displays second text (characters) in the second language, which is obtained by translating the speech of the first language into the second language; and outputs the second text in the second language in the form of a speech. In such a manner, speech translation apparatus 1 simultaneously outputs: the first text on which speech recognition has been performed; the second text into which the first text has been translated; and a speech of the second text.

In the present embodiment, speech translation apparatus 1 recognizes a speech of the second speaker in the second language in response to the first speaker performing operation input on speech translation apparatus 1 when the second speaker starts uttering a speech. Upon recognition of the speech of the second speaker in the second language, speech translation apparatus 1: displays the recognized speech in second text in the second language; displays first text which is obtained by translating the speech of the second language into the first language; and outputs, in the form of a speech, the first text obtained by the translation. In such a manner, speech translation apparatus 1 simultaneously outputs: the second text on which speech recognition has been performed; the first text into which the second text has been translated; and a speech of the first text.

The first speaker and the second speaker have a face-to-face conversation and a side-by-side conversation using speech translation apparatus 1. Accordingly, speech translation apparatus 1 may change display format.

Speech translation apparatus 1 is a mobile terminal such as a smartphone or a tablet terminal which can be carried by the first speaker.

Next, a specific configuration of speech translation apparatus 1 will be described.

Figure 2:
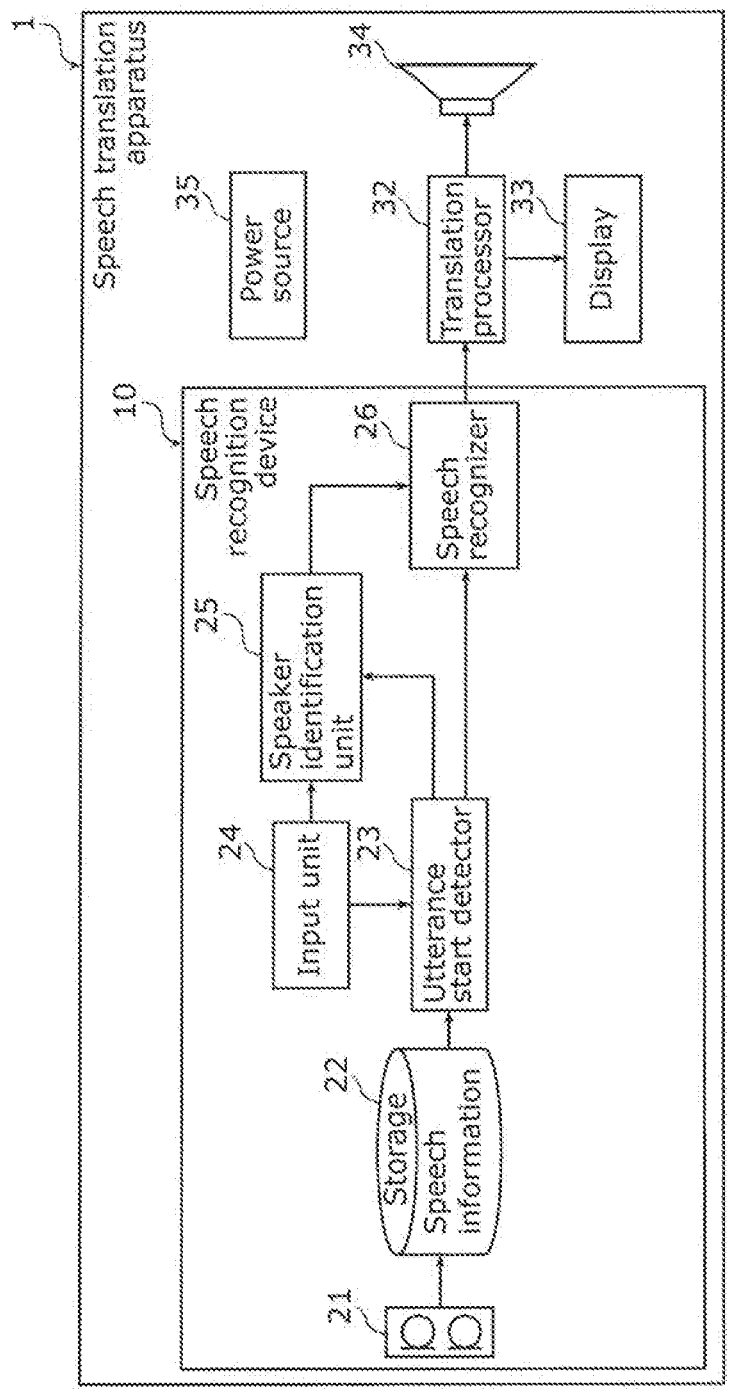
FIG. 2 is a block diagram illustrating the speech translation apparatus according to Embodiment 1.

FIG. 2 is a block diagram illustrating speech translation apparatus 1 according to Embodiment 1.

As illustrated in FIG. 2, speech translation apparatus 1 includes speech recognition device 10, translation processor 32, display 33, speech output unit 34, and power source 35.

[Speech Recognition Device 10]

Speech recognition device 10 is a device for a conversation between the first speaker and at least one second speaker who is the conversation partner of the first speaker, and performs speech recognition on a conversation, that is, a speech of the first speaker who speaks the first language and a speech of the second speaker who speaks the second language.

Speech recognition device 10 includes input unit 24, obtaining unit 21, storage 22, utterance start detector 23, speaker identification unit 25, and speech recognizer 26.

Input unit 24 is an operation input unit which receives operation input from at least the first speaker. Specifically, input unit 24 receives operation input from the first speaker immediately before the first speaker utters a speech, and receives operation input from the first speaker immediately after the second speaker starts uttering a speech. In other words, input unit 24 receives operation input from the first speaker for every speech of the first speaker and for every speech of at least one second speaker. The operation input to input unit 24 serves as a trigger to perform speech recognition on each speech uttered in the conversation between the first speaker and at least one second speaker.

The operation input from the first speaker to input unit 24 may trigger storage 22 to start recording a speech or may trigger storage 22 to cancel or stop recording a speech.

Input unit 24 generates an input signal in response to the operation input, and outputs the generated input signal to utterance start detector 23. Input unit 24 also generates an input signal which includes first timing at which input unit 24 has received the operation input from the first speaker, and outputs the generated input signal to speaker identification unit 25. The input signal includes information indicating the first timing (a time stamp).

Figure 1B:
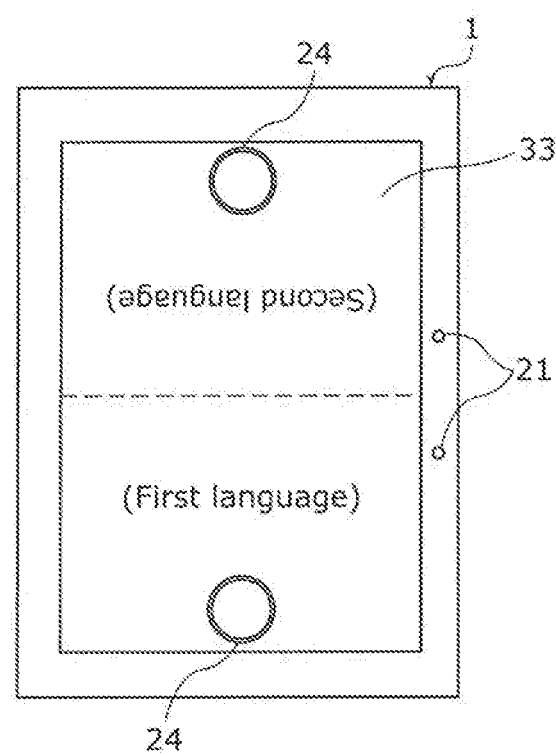
FIG. 1B illustrates an example of the external appearance of another speech translation apparatus according to Embodiment 1.

Input unit 24 is, for example, one operation button provided to speech recognition device 10. Speech recognition device 10 may include two or more input units 24. Note that input unit 24 in the present embodiment is a touch sensor integrated with display 33 of speech translation apparatus 1. In this case, as illustrated in FIG. 1B, display 33 of speech translation apparatus 1 may display a plurality of input units 24 that are operation buttons which receive operation input from the first speaker. FIG. 18 illustrates an example of the external appearance of another speech translation apparatus according to Embodiment 1.

As illustrated in FIG. 1A, obtaining unit 21 obtains a speech uttered in the conversation between the first speaker and at least one second speaker. Specifically, obtaining unit 21 obtains a speech uttered in the conversation between the first speaker and at least one second speaker, converts a sound including the obtained speech of a speaker into a speech signal, and outputs the speech signal obtained by the conversion to storage 22.

Obtaining unit 21 is a microphone unit which obtains a speech signal by converting a sound including a speech into a speech signal including the speech. Note that obtaining unit 21 may be an input interface electrically connected with a microphone. That is to say, obtaining unit 21 may obtain a speech signal from the microphone. Obtaining unit 21 may be a microphone array unit composed of a plurality of microphones. Since obtaining unit 21 is sufficient as long as it is capable of picking up a speech of a speaker present in the vicinity of speech recognition device 10, the location of obtaining unit 21 in speech translation apparatus 1 is not particularly limited.

Storage 22 stores the speech uttered in the conversation between the first speaker and at least one second speaker and obtained by obtaining unit 21. Specifically, storage 22 stores speech information on the speech included in the speech signal obtained from obtaining unit 21. That is to say, storage 22 automatically stores speech information which includes the speech uttered in the conversation between the first speaker and at least one second speaker.

Storage 22 resumes recording upon startup of speech recognition device 10, that is, upon startup of speech translation apparatus 1. Storage 22 may start recording when the first speaker initially performs operation input on input unit 24 after startup of speech translation apparatus 1. That is to say, operation input to input unit 24 may trigger storage 22 to start recording a speech. Furthermore, operation input to input unit 24 may trigger storage 22 to cancel or stop recording a speech.

For example, upon finish of speech recognition on the speech of the first speaker who has performed operation input on input unit 24, storage 22 starts to store a speech obtained by obtaining unit 21, so as to store a speech of the second speaker. In other words, at least during a period from when storage of the speech information on the speech of the first speaker is finished to when speech recognition on the speech of the first speaker is finished, storage 22 does not store a sound obtained by obtaining unit 21.

Due to the limited capacity of storage 22, the speech information stored in storage 22 may be deleted automatically in chronological order when a specified capacity is reached. That is to say, the speech information including a speech of a speaker may be added with information indicating a date and time (a time stamp).

Storage 22 may include a hard disk drive (HDD) or a semiconductor memory, for example.

Utterance start detector 23 is a detection device which, after the first speaker performs operation input on input unit 24, detects the start position of a speech stored in storage 22, in response to the operation input performed on input unit 24. Here, the start position of a speech is a position (timing) at which utterance of the speech has started. Specifically, utterance start detector 23 detects the start position of, among one or more speeches stored in storage 22, a speech which: has been uttered by the first speaker in a specified period starting at the first timing at which the first speaker has performed operation input on input unit 24; and is indicated in the speech information stored as a result of the first speaker uttering the speech. In other words, utterance start detector 23 detects, from the specified period starting at the first timing at which the operation input on input unit 24 has been completed, the start position of the speech of the first speaker, that is, the second timing at which utterance of the speech of the first speaker has started.

Utterance start detector 23 also detects the start position of, among one or more speeches stored in storage 22, a speech which: the second speaker has started to utter in a specified period ending at the first timing at which the first speaker has performed operation input on input unit 24; and is indicated in the speech information stored as a result of the second speaker uttering the speech. In other words, utterance start detector 23 detects, from the specified period ending at the first timing at which the operation input on input unit 24 has been completed, the start position of the speech of the second speaker, that is, the second timing at which utterance of the speech of the second speaker has started.

Utterance start detector 23 generates start position information indicating the start position of the speech, and outputs the generated start position information to speaker identification unit 25 and speech recognizer 26. The start position information is information indicating the start position of the speech uttered by the first speaker, that is, the timing at which utterance of the speech of the first speaker has started (a time stamp). Further, the start position information is information indicating the start position of the speech uttered by the second speaker, that is, the timing at which utterance of the speech of the second speaker has started (a time stamp).

Upon obtaining the input signal from input unit 24, speaker identification unit 25 identifies the speaker of the speech as either the first speaker who has performed operation input on input unit 24 or the second speaker who has not performed operation input on input unit 24, based on the first timing and the second timing which are set for each speech. Here, the first timing is timing at which input unit 24 has received operation input from the first speaker, and the second timing is timing which indicates the start position of the speech detected by utterance start detector 23.

Specifically, speaker identification unit 25 compares the first timing and the second timing which are set for each speech uttered in a conversation between the first speaker and at least one second speaker. More specifically, speaker identification unit 25 compares the first timing included in the input signal obtained from input unit 24 and the second timing which is the start position of a speech in a specified period before or after the first timing. By doing so, speaker identification unit 25 identifies the speaker of the speech as the first speaker or the second speaker.

For example, when the first timing is earlier than the second timing, speaker identification unit 25 determines that the speech which has been input to speech recognition device 10 (stored in storage 22) is the speech of the first speaker, and thus identifies the speaker of the speech as the first speaker from the first speaker and the second speaker. When the second timing is earlier than the first timing, speaker identification unit 25 determines that the speech which has been input to speech recognition device 10 (stored in storage 22) is the speech of the second speaker, and thus identifies the speaker of the speech as the second speaker from the first speaker and the second speaker.

Furthermore, speaker identification unit 25 identifies the speaker as the first speaker or the second speaker, for each speech uttered by the first speaker and at least one second speaker in a specified period before or after the first timing at which input unit 24 has received operation input from the first speaker. Specifically, in a conversation between at least one first speaker and at least one second speaker, speaker identification unit 25, with the first timing serving as a reference point at which input unit 24 has received operation input, selects, from one or more speeches stored in storage 22, a speech most recently uttered by a speaker in a specified period ending at the first timing or in a specified period starting at the first timing. Speaker identification unit 25 identifies the speaker of the selected speech as the first speaker or the second speaker. Here, the specified period may be, for example, a few seconds such as 1 or 2 seconds, or may be 10 seconds, for example. Accordingly, speaker identification unit 25 identifies the speaker as the first speaker or the second speaker based on the first timing and the second timing of each of the most recent speech of the first speaker and the most recent speech of at least one second speaker. This is to prevent speaker identification unit 25 from inaccurately identifying the speaker of the most recent speech as the first speaker or the second speaker, because the speaker identification becomes inaccurate if the identification is based on a speech that is too old. Speaker identification unit 25 outputs, to speech recognizer 26, result information which includes the result of the speaker identification. The result information includes: information indicating that the speaker of the speech indicated in the speech information stored as a result of the first speaker uttering the speech is identified as the first speaker; or information indicating that the speaker of the speech indicated in the speech information stored as a result of the second speaker uttering the speech is identified as the second speaker.

Upon obtaining the result information from speaker identification unit 25 and the start position information from utterance start detector 23, speech recognizer 26 performs, based on the result information and the start position information, speech recognition on the speech of either the first speaker or at least one second speaker identified by speaker identification unit 25, from the start position of the speech. Specifically, when the first speaker is identified from the first speaker and at least one second speaker, speech recognizer 26 performs speech recognition, in the first language, on the most recent speech of the identified first speaker which is indicated in the speech information on that most recent speech. When the second speaker is identified from the first speaker and at least one second speaker, speech recognizer 26 performs speech recognition, in the second language, on the most recent speech of the identified second speaker which is indicated in the speech information on that most recent speech. The speech recognition performed by speech recognizer 26 is to recognize, in the first language or the second language, the content of a speech uttered by a speaker. The first text and the second text each indicating the content of a speech recognized are generated by speech recognizer 26. Speech recognizer 26 outputs the generated first text and second text to translation processor 32.

[Translation Processor 32]

Translation processor 32 translates text obtained from speech recognizer 26 from a language recognized from the text (recognized language) into another language, and generates text expressed in the other language.

Specifically, upon obtaining the first text from speech recognizer 26, translation processor 32 translates the first text from the first language in which the first text is expressed, into the second language, to generate second text which is the translation in the second language. Translation processor 32 recognizes the content of the second text, and generates a translation speech which indicates, in the second language, the content of the second text recognized. Translation processor 32 outputs the generated first text and second text to display 33, and also outputs information indicating the translation speech in the second language to speech output unit 34.

Furthermore, upon obtaining the second text from speech recognizer 26, translation processor 32 translates the second text from the second language in which the second text is expressed, into the first language, and generates first text which is the translation in the first language. Translation processor 32 recognizes the content of the first text, and generates a translation speech which indicates, in the first language, the content of the first text recognized. Translation processor 32 outputs the generated second text and first text to display 33, and also outputs information indicating the translation speech generated in the first language to speech output unit 34.

Note that speech translation apparatus 1 need not include translation processor 32; a cloud server may include translation processor 32. In this case, speech translation apparatus 1 may be communicatively connected with the cloud server via a network, and transmit, to the cloud server, the first text or second text on which speech recognition has been performed by speech recognition device 10. Speech translation apparatus 1 may receive the translated second text or first text and the translation speech, output the received second text or first text to display 33, and output the received translation speech to speech output unit 34.

[Display 33]

Display 33 is, for example, a monitor such as a liquid crystal panel or an organic electroluminescent (EL) panel. Display 33 displays the first text and second text obtained from translation processor 32.

Display 33 changes the layout of the screen on which the first text and second text are displayed, according to the positional relationship between the first speaker and the second speaker with respect to speech recognition device 10. For example, when the first speaker utters a speech, display 33 displays, in a region of display 33 located on the first speaker side, the first text obtained by performing speech recognition on the first speaker's speech, and displays, in a region of display 33 located on the second speaker side, the second text obtained by translating the first speaker's speech. Furthermore, when the second speaker utters a speech, display 33 displays, in the region of display 33 located on the second speaker side, the second text obtained by performing speech recognition on the second speaker's speech, and displays, in the region of display 33 located on the first speaker side, the first text obtained by translating the second speaker's speech. In these cases, display 33 displays the first text and the second text in a manner that the characters of the first text and the characters of the second text are flipped vertically. Note that when the first speaker and the second speaker are next to each other when conversing, display 33 displays the first text and the second text in a manner that the characters of the first text and the characters of the second text are in the same orientation.

[Speech Output Unit 34]

Speech output unit 34 is a loudspeaker which outputs a translation speech indicated in information indicating the translation speech obtained from translation processor 32. In other words, when the first speaker utters a speech, speech output unit 34 outputs a translation speech by playing the translation speech the content of which is the same as the content of the second text displayed on display 33. Furthermore, when the second speaker utters a speech, speech output unit 34 outputs a translation speech by playing the translation speech the content of which is the same as the content of the first text displayed on display 33.

[Power Source 35]

Power source 35 is a primary cell or a secondary cell, for example, and is electrically connected with speech recognition device 10, translation processor 32, display 33, speech output unit 34, etc. via a line. Power source 35 supplies power to speech recognition device 10, translation processor 32, display 33, speech output unit 34, etc. Note that although power source 35 in the present embodiment is provided in speech translation apparatus 1, power source 35 may be provided in speech recognition device 10.

<Operation>

An operation of speech translation apparatus 1 having the above configuration will be described.

Figure 3:
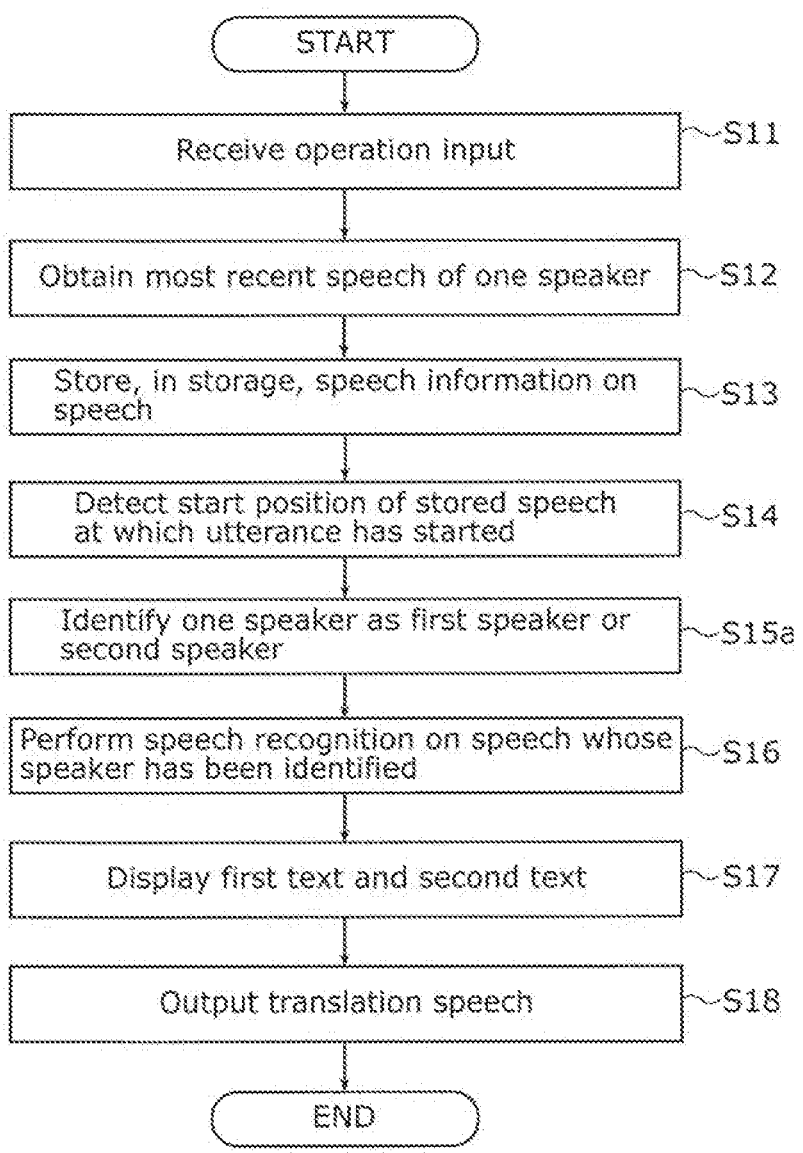
FIG. 3 is a flow chart illustrating an operation of the speech translation apparatus performed when the first speaker utters a speech.
Figure 4:
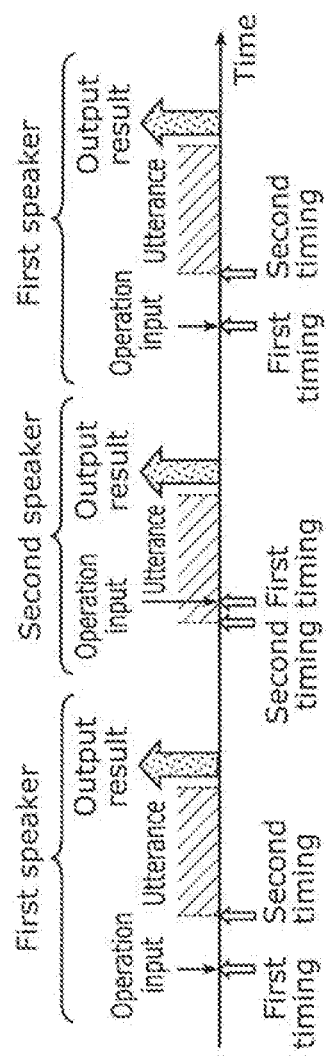
FIG. 4 illustrates an example of a time series indicating first timing and second timing in a conversation between the first speaker and the second speaker.

FIG. 3 is a flow chart illustrating an operation of speech translation apparatus 1 according to Embodiment 1. FIG. 4 illustrates an example of a time series indicating the first timing and the second timing in a conversation between the first speaker and the second speaker. FIG. 3 and FIG. 4 assume a case where the first speaker and the second speaker have a one-to-one conversation. FIG. 3 and FIG. 4 also assume a case where the owner of speech translation apparatus 1 is the first speaker and the first speaker mainly operates speech translation apparatus 1. Speech translation apparatus 1 configures settings in advance that the first speaker speaks the first language and the second speaker speaks the second language.

As illustrated in FIG. 1A, FIG. 3, and FIG. 4, first, when the first speaker and the second speaker have a conversation, the first speaker performs operation input on input unit 24 before uttering a speech. That is to say, input unit 24 receives operation input from the first speaker (S11). Specifically, input unit 24 generates an input signal in response to the operation input received, and outputs the generated input signal to utterance start detector 23. Input unit 24 also generates an input signal which includes first timing at which input unit 24 has received the operation input from the first speaker, and outputs the generated input signal to speaker identification unit 25.

Next, the first speaker, who, being the owner of speech recognition device 10, obviously knows the timing at which to speak, starts utterance after performing operation input on input unit 24. When the first speaker and the second speaker have a conversation, speech recognition device 10 obtains a speech of one speaker (S12). That is to say, when one speaker utters a speech, obtaining unit 21 obtains the speech of the one speaker. Obtaining unit 21 converts the obtained speech of the one speaker into a speech signal which includes the obtained speech, and outputs the speech signal to storage 22.

Next, storage 22 stores speech information on the speech included in the speech signal obtained from obtaining unit 21 in Step S12 (S13). That is to say, storage 22 automatically stores speech information on the most recent speech of the one speaker.

Next, upon obtaining the input signal from input unit 24, utterance start detector 23 detects the start position (second timing) of the speech stored in storage 22 in Step S13, that is, detects the start position at which utterance of the speech has started (S14). Specifically, utterance start detector 23 detects the start position of the speech which has been uttered by the one speaker immediately after the first speaker performed operation input on input unit 24 and which is indicated in the speech information stored as a result of the one speaker uttering the speech.

Utterance start detector 23 generates start position information indicating the start position of the speech, and outputs the generated start position information to speaker identification unit 25 and speech recognizer 26.

Next, upon obtaining the input signal from input unit 24, speaker identification unit 25 identifies the one speaker as either the first speaker who has performed operation input on input unit 24 or the second speaker who has not performed operation input on input unit 24, based on the first timing and the second timing which are set for each speech (S15a). Specifically, speaker identification unit 25 compares the first timing and the second timing. More specifically, speaker identification unit 25 determines whether the first timing is earlier than the second timing.

For example, when the first timing is earlier than the second timing, speaker identification unit 25 determines that the speech which has been input to speech recognition device 10 (stored in storage 22) is the speech of the first speaker who is the one speaker, and thus identifies the speaker of the speech as the first speaker from the first speaker and the second speaker. When the second timing is earlier than the first timing, speaker identification unit 25 determines that the speech which has been input to speech recognition device 10 (stored in storage 22) is the speech of the second speaker who is the other speaker, and thus identifies the speaker of the speech as the second speaker from the first speaker and the second speaker.

In this case, the first timing is earlier than the second timing, and thus, speaker identification unit 25 determines that the speech which has been input to speech recognition device 10 (stored in storage 22) is the speech of the first speaker, and thus identifies the speaker of the speech as the first speaker from the first speaker and the second speaker. Speaker identification unit 25 outputs, to speech recognizer 26, result information which includes the result of the speaker identification. The result information includes information indicating that the speaker of the speech indicated in the speech information on the speech obtained in Step S12 has been identified as the first speaker.

Next, upon obtaining the result information from speaker identification unit 25 and the start position information from utterance start detector 23, speech recognizer 26 performs, based on the result information and the start position information, speech recognition on the speech of the first speaker identified by speaker identification unit 25 (S16).

Specifically, speech recognizer 26 obtains, from storage 22 via utterance start detector 23, the speech information on the most recent speech of the first speaker obtained in Step S12. Speech recognizer 26 performs speech recognition on the speech of the first speaker indicated in the speech information obtained from storage 22 via utterance start detector 23.

More specifically, speech recognizer 26 recognizes, in the first language, the content of the speech of the first speaker, and generates first text indicating the content of the speech recognized. That is to say, the content of the first text coincides with the content of the speech of the first speaker, and is indicated in the first language. Speech recognizer 26 outputs the generated first text to translation processor 32.

Upon obtaining the first text from speech recognizer 26, translation processor 32 translates the first text from the first language into the second language to generate second text which is the translation in the second language. That is to say, the content of the second text expressed in the second language coincides with the content of the first text expressed in the first language.

Translation processor 32 recognizes the content of the second text, and generates a translation speech which indicates, in the second language, the content of the second text recognized.

Translation processor 32 outputs the generated first text and second text to display 33, and also outputs information indicating the translation speech generated in the second language to speech output unit 34.

Display 33 displays the first text and second text obtained from translation processor 32 (S17) Specifically, display 33 displays the first text on the screen located on the first speaker side, and displays the second text on the screen located on the second speaker side. Display 33 displays the characters of the first text in the correct orientation with respect to the first speaker so that the first text is readable to the first speaker, and displays the characters of the second text in the correct orientation with respect to the second speaker so that the second text is readable to the second speaker. That is to say, the characters of the first text are flipped vertically with respect to the characters of the second text.

Speech output unit 34 outputs the translation speech in the second language indicated in the information which is obtained from translation processor 32 and indicates the translation speech in the second language (S18). That is to say, speech output unit 34 outputs the translation speech obtained by translation from the first language into the second language. With this, by hearing the translation speech in the second language, the second speaker can understand the speech of the first speaker. Since display 33 displays the second text, it is ensured that the second speaker can understand the speech of the first speaker in the form of text, too.

Figure 5:
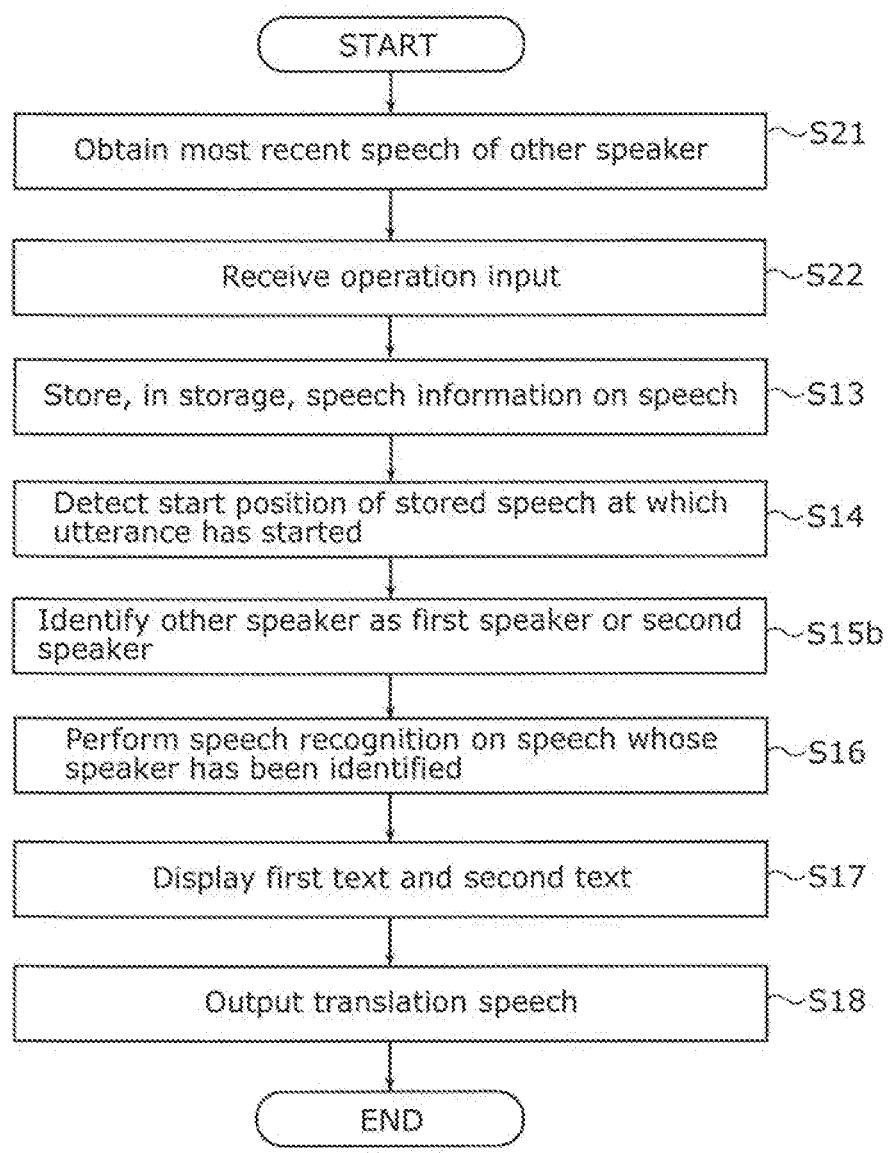
FIG. 5 is a flow chart illustrating an operation of the speech translation apparatus performed when the second speaker utters a speech.

Next, the case where the second speaker utters a speech will be described with reference to FIG. 5. FIG. 5 is a flow chart illustrating an operation of the speech translation apparatus performed when the second speaker utters a speech. Description of the processing common to FIG. 3 will be omitted as appropriate.

As illustrated in FIG. 1A, FIG. 4, and FIG. 5, first, the first speaker, who is incapable of knowing the timing at which the second speaker would utter a speech, performs operation input on input unit 24 after the second speaker starts to utter a speech.

First, when the first speaker and the second speaker have a conversation, speech recognition device 10 obtains a speech of the other speaker (S21). That is to say, when the other speaker utters a speech, obtaining unit 21 obtains the speech of the other speaker. Obtaining unit 21 converts the obtained speech of the other speaker into a speech signal which includes the obtained speech, and outputs the speech signal to storage 22.

Next, the other speaker utters a speech in the second language. The first speaker, who is conversing with the second speaker, performs operation input on input unit 24 after the second speaker starts to utter a speech. That is to say, input unit 24 receives operation input from the first speaker (S22). Specifically, input unit 24 outputs, to utterance start detector 23, an input signal in response to the operation input received, and outputs, to speaker identification unit 25, an input signal which includes timing (first timing) at which input unit 24 has received the operation input.

Next, storage 22 stores speech information on the speech included in the speech signal obtained from obtaining unit 21 in Step S21 (S13). That is to say, storage 22 automatically stores speech information on the most recent speech of the other speaker.

Next, utterance start detector 23 detects the start position (second timing) of the speech which the other speaker had started to utter immediately before the first speaker performed operation input on input unit 24 and which is indicated in the speech information stored as a result of the other speaker uttering the speech (S14).

Utterance start detector 23 generates start position information indicating the start position of the speech, and outputs the generated start position information to speaker identification unit 25 and speech recognizer 26.

Next, speaker identification unit 25 compares the first timing and the second timing and determines whether the first timing is earlier than the second timing, so as to identify the other speaker as the first speaker or the second speaker (S15b).

In this case, the second timing is earlier than the first timing, and thus, speaker identification unit 25 determines that the speech which has been input to speech recognition device 10 (stored in storage 22) is the speech of the second speaker who is the other speaker, and thus identifies the speaker of the speech as the second speaker from the first speaker and the second speaker. Speaker identification unit 25 outputs, to speech recognizer 26, result information which includes the result of the speaker identification. The result information includes information indicating that the speaker of the speech indicated in the speech information on the speech obtained in Step S21 has been identified as the second speaker.

Next, upon obtaining the result information from speaker identification unit 25 and the start position information from utterance start detector 23, speech recognizer 26 performs, based on the result information and the start position information, speech recognition on the speech of the second speaker identified by speaker identification unit 25 (S16).

Specifically, speech recognizer 26 obtains, from storage 22 via utterance start detector 23, the speech information on the most recent speech of the second speaker obtained in Step S21. Speech recognizer 26 performs speech recognition on the speech of the second speaker indicated in the speech information obtained from storage 22 via utterance start detector 23.

More specifically, speech recognizer 26 recognizes, in the second language, the content of the speech of the second speaker, and generates second text indicating the content of the speech recognized. That is to say, the content of the second text coincides with the content of the speech of the second speaker, and is indicated in the second language. Speech recognizer 26 outputs the generated second text to translation processor 32.

Upon obtaining the second text from speech recognizer 26, translation processor 32 translates the second text from the second language into the first language to generate first text which is the translation in the first language. That is to say, the content of the first text expressed in the first language coincides with the content of the second text expressed in the second language.

Translation processor 32 recognizes the content of the first text, and generates a translation speech which indicates, in the first language, the content of the first text recognized.

Translation processor 32 outputs the generated second text and first text to display 33, and also outputs information indicating the translation speech generated in the first language to speech output unit 34.

Display 33 displays the second text and first text obtained from translation processor 32 (S17). Specifically, display 33 displays the first text on the screen located on the first speaker side, and displays the second text on the screen located on the second speaker side. Display 33 displays the characters of the first text in the correct orientation with respect to the first speaker so that the first text is readable to the first speaker, and displays the characters of the second text in the correct orientation with respect to the second speaker so that the second text is readable to the second speaker. That is to say, the characters of the first text are flipped vertically with respect to the characters of the second text.

Speech output unit 34 outputs the translation speech in the first language indicated in the information which is obtained from translation processor 32 and indicates the translation speech in the first language (S18). That is to say, speech output unit 34 outputs the translation speech obtained by translation from the second language into the first language. With this, by hearing the translation speech in the first language, the first speaker can understand the speech of the second speaker. Since display 33 displays the first text, it is ensured that the first speaker can understand the speech of the second speaker in the form of text, too.

Speech translation apparatus 1 then finishes the processing.

Figure 6:
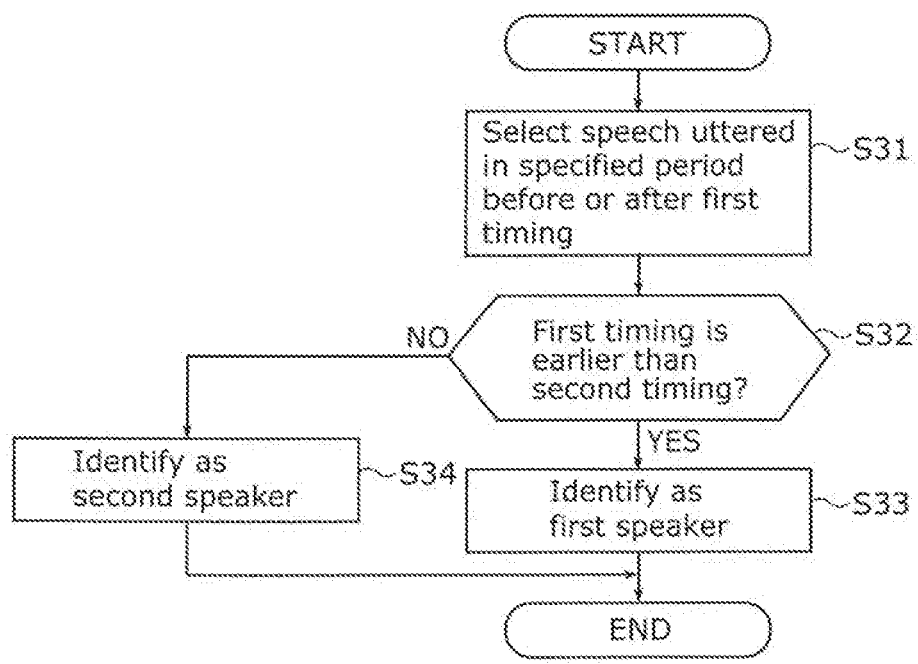
FIG. 6 is a flow chart illustrating an operation of a speaker identification unit included in the speech translation apparatus according to Embodiment 1.

FIG. 6 is a flow chart illustrating an operation of speaker identification unit 25 included in speech translation apparatus 1 according to Embodiment 1. FIG. 6 is a flow chart specifically illustrating the processing in Step S15a in FIG. 3 and Step S15b in FIG. 5.

As illustrated in FIG. 3, FIG. 5, and FIG. 6, first, with the first timing serving as the reference point at which input unit 24 has received operation input from the first speaker, speaker identification unit 25 selects, from among one or more speeches stored in storage 22, the most recent speech of a speaker uttered in a specified period ending at the first timing or a specified period starting at the first timing (S31).

Next, speaker identification unit 25 compares the first timing and the second timing which are set every time the first speaker utters a speech and every time the second speaker utters a speech, and determines whether the first timing is earlier than the second timing (S32).

When the first timing is determined to be earlier than the second timing (YES in S32), speaker identification unit 25 identifies the speaker of the speech as the first speaker from the first speaker and the second speaker (S33). Here, the first timing being earlier than the second timing means that the first speaker has first performed operation input on input unit 24 (the first timing) and then uttered a speech (the second timing). This is because the first speaker knows the timing at which to utter a speech. Accordingly, speaker identification unit 25 can identify the speaker of the speech as the first speaker from the first speaker and the second speaker based on the first timing and the second timing.

Speaker identification unit 25 outputs, to speech recognizer 26, result information including the result that the speaker of the speech has been identified as the first speaker from the first speaker and the second speaker. Speaker identification unit 25 then finishes the processing.

When the second timing is determined to be earlier than the first timing (NO in S32), speaker identification unit 25 identifies the speaker of the speech as the second speaker from the first speaker and the second speaker (S34). Here, the second timing being earlier than the first timing means that the first speaker has performed the operation input on input unit 24 (the first timing) after the second speaker started to utter a speech (the second timing), because the first speaker does not know the timing at which the second speaker would utter a speech. Accordingly, speaker identification unit 25 can identify the speaker of the speech as the second speaker from the first speaker and the second speaker based on the first timing and the second timing.

Speaker identification unit 25 outputs, to speech recognizer 26, result information including the result that the speaker of the speech has been identified as the second speaker from the first speaker and the second speaker. Speaker identification unit 25 then finishes the processing.

Advantageous Effects

Next, advantageous effects of speech recognition device 10 according to the present embodiment will be described.

As described above, speech recognition device 10 according to the present embodiment is speech recognition device 10 for a conversation between a first speaker and at least one second speaker who is a conversation partner of the first speaker, the speech recognition device including: obtaining unit 21 which obtains a speech uttered in the conversation between the first speaker and the at least one second speaker; storage 22 which stores the speech uttered in the conversation between the first speaker and the at least one second speaker and obtained by obtaining unit 21; input unit 24 which receives operation input from at least the first speaker; utterance start detector 23 which, in response to the operation input received by input unit 24, detects a start position of the speech stored in storage 22, the start position being a position at which utterance of the speech has started; and speaker identification unit which identifies a speaker of the speech as one of the first speaker who has performed the operation input on input unit 24 and the at least one second speaker who has not performed the operation input on input unit 24, based on first timing and second timing which are set for each of speeches uttered in the conversation between the first speaker and the at least one second speaker, the first timing being timing at which input unit 24 has received the operation input, the second timing being timing which indicates the start position of the speech detected by utterance start detector 23, wherein speech recognition is performed on the speech uttered by the one of the first speaker and the at least one second speaker identified by speaker identification unit 25, the speech recognition being performed by speech recognizer 26 from the start position of the speech.

In view of the above, according to the present embodiment, since a speech uttered in the conversation between the first speaker and at least one second speaker is stored in storage 22, it is possible to identify the speaker of the stored speech as either the first speaker or a second speaker. This enables speech recognizer 26 to read, from storage 22, the speech of either the first speaker or the at least one second speaker identified, and perform speech recognition on the speech which has been read. That is to say, if the first speaker utters a speech after the first speaker performs operation input on input unit 24, speech recognizer 26 can perform speech recognition on the speech of the first speaker. Moreover, since the second speaker usually starts to utter a speech after the first speaker has finished uttering a speech, speech recognizer 26 can perform speech recognition on the speech of the second speaker with a trigger of the first speaker performing operation input on input unit 24 in response to the second speaker starting a speech.

Accordingly, by reliably obtaining a speech of the second speaker (the conversation partner), speech recognition device 10 can perform speech recognition on the speech of the second speaker (the conversation partner).

A speech recognition method according to the present embodiment is a speech recognition method for a conversation between a first speaker and at least one second speaker who is a conversation partner of the first speaker, the speech recognition method including: obtaining a speech uttered in the conversation between the first speaker and the at least one second speaker; storing, in storage 22, the speech uttered in the conversation between the first speaker and the at least one second speaker and obtained; receiving, by input unit 24, operation input from at least the first speaker; detecting, in response to the operation input received by input unit 24, a start position the speech stored in storage 22, the start position being a position at which utterance of the speech has started; identifying a speaker of the speech as one of the first speaker who has performed the operation input on input unit 24 and the at least one second speaker who has not performed the operation input on input unit 24, based on first timing and second timing which are set for each of speeches uttered in the conversation between the first speaker and the at least one second speaker, the first timing being timing at which input unit 24 has received the operation input, the second timing being timing which indicates the start position of the speech detected; and performing speech recognition on the speech of the one of the first speaker and the at least one second speaker identified, the speech recognition being performed from the start position of the speech.

This speech recognition method yields the same advantageous effects as those of speech recognition device 10 described above.

A recording medium according to the present embodiment is a non-transitory computer-readable recording medium for use in a computer, the recording medium having a computer program recorded thereon for causing the computer to execute the speech recognition method.

This recording medium yields the same advantageous effects as those of speech recognition device 10 described above.

In speech recognition device 10 according to the present embodiment, speaker identification unit 25: compares the first timing and the second timing which are set for each speech uttered in the conversation between the first speaker and the at least one second speaker; identifies the speaker of the speech as the first speaker from the first speaker and the at least one second speaker when the first timing is earlier than the second timing; and identifies the speaker of the speech as the at least one second speaker from the first speaker and the at least one second speaker when the second timing is earlier than the first timing.

Accordingly, when, for example, the first speaker is the owner of speech recognition device 10, the first speaker knows how to use speech recognition device 10 that he or she owns, and thus starts to utter a speech after performing operation input on input unit 24. In other words, the first timing at which input unit 24 receives the operation input from the first speaker is earlier than the second timing at which the first speaker starts to utter a speech, and thus, speaker identification unit 25 can identify the speaker of the speech as the first speaker from the first speaker and at least one second speaker. Since the first speaker cannot recognize the timing at which the second speaker would utter a speech, the first speaker performs operation input on input unit 24 when the second speaker starts to utter a speech. In other words, the first timing at which input unit 24 receives the operation input from the first speaker is later than the second timing at which the second speaker starts to utter a speech, and thus, speaker identification unit 25 can identify the speaker of the speech as the second speaker from the first speaker and at least one second speaker.

In such a manner, speaker identification unit 25 can accurately identify the speaker of a speech uttered at timing closest to the first timing as the first speaker or the second speaker. As such, since speech recognition device 10 can more reliably obtain a speech of the second speaker, it is possible to perform speech recognition on the speech of the second speaker.

In speech recognition device 10 according to the present embodiment, when the speaker of the speech is identified as the first speaker from the first speaker and the at least one second speaker, speech recognizer 26 performs the speech recognition on the speech of the first speaker, and when the speaker of the speech is identified as a second speaker from the first speaker and the at least one second speaker, the speech recognizer performs the speech recognition on the speech of the second speaker.

Accordingly, since speaker identification unit 25 identifies the speaker of the speech as the first speaker or the second speaker, speech recognizer 26 can more reliably perform speech recognition on each speech of the first speaker and the second speaker.

In speech recognition device 10 according to the present embodiment, speaker identification unit 25 identifies the speaker as one of the first speaker and the at least one second speaker, for each speech uttered in the conversation between the first speaker and the at least one second speaker in a specified period before or after the first timing at which input unit 24 has received the operation input.

Accordingly, it is possible to provide specified periods with the first timing serving as the reference point, in order to identify the speaker as the first speaker or the second speaker. This makes it possible to identify, as the first speaker or the second speaker, the speaker of the most recent speech uttered in a specified period ending at the first timing at which the first speaker performs operation input or in a specified period starting at the first timing. This makes it possible to recognize the speech of the first speaker and the speech of the second speaker individually. As a result, speech recognition device 10 can accurately identify the speaker of a speech as the first speaker or the second speaker.

In speech recognition device 10 according to the present embodiment, upon finish of the speech recognition on a speech of the first speaker who has performed the operation input on input unit 24, storage 22 starts to store a speech obtained by obtaining unit 21, to store a speech of the at least one second speaker.

Usually, after the utterance of the speech of the first speaker, the second speaker starts uttering a speech when the second speaker understood the content of the speech of the first speaker. Upon finish of the speech recognition on the speech of the first speaker, recording starts before the second speaker starts uttering a speech, and therefore, storage 22 can reliably store the speech of the second speaker. Moreover, speech recognition device 10 can suspend the storage of a speech during a time period from when at least the first speaker has finished utterance of a speech until when storage 22 starts recording. This makes it possible to reduce consumption of power by speech recognition device 10 for storing a speech in storage 22.

Speech recognition device 10 according to the present embodiment includes speech recognizer 26 which performs the speech recognition on the speech of the one of the first speaker and the at least one second speaker identified by speaker identification unit 25, the speech recognition being performed from the start position of the speech.

Accordingly, since it is speech recognition device 10 that performs speech recognition, there is no need to transmit a speech to an external cloud server, and therefore, it is possible to reduce an increase in the volume of communication between speech recognition device 10 and the cloud server.

In speech recognition device 10 according to the present embodiment, input unit 24 is one operation button provided to speech recognition device 10.

Accordingly, the first speaker can easily operate speech recognition device 10.

In speech recognition device 10 according to the present embodiment, input unit 24 receives the operation input from the first speaker for every speech of the first speaker and for every speech of the at least one second speaker.

Accordingly, by avoiding as much as possible the second speaker from performing operation input, and by instead having the first speaker take the initiative in performing operation input on speech recognition device 10, it is possible to reliably identify the speaker of a speech as one of the first speaker and the second speaker.

Embodiment 2

<Configuration>

A configuration of speech translation apparatus 1 according to the present embodiment will be described with reference to FIG. 7.

Figure 7:
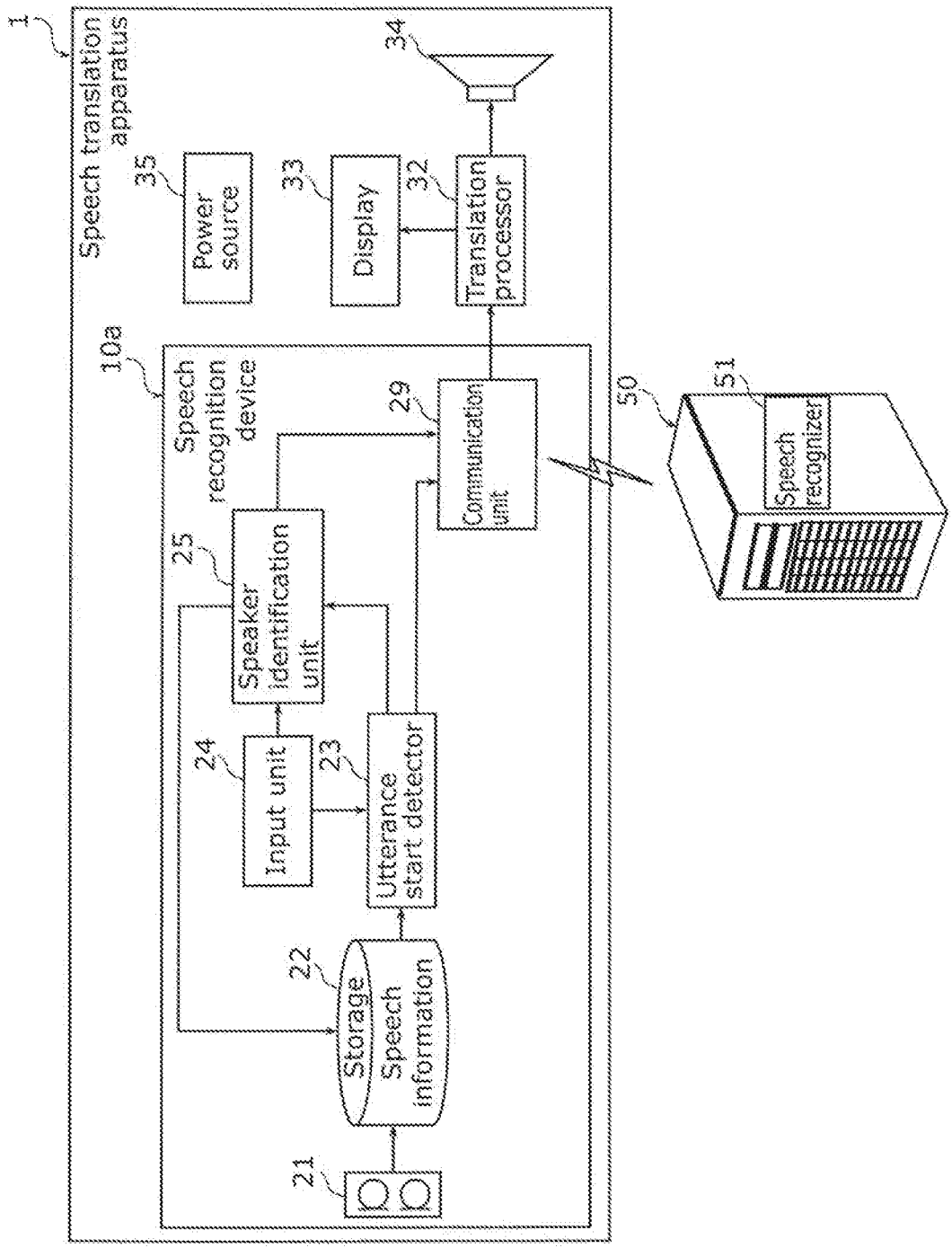
FIG. 7 is a block diagram illustrating a speech translation apparatus according to Embodiment 2.

FIG. 7 is a block diagram illustrating speech translation apparatus 1 according to Embodiment 2.

The present embodiment is different from Embodiment 1 in that while speech recognizer 26 in Embodiment 1 is included in speech recognition device 10, speech recognizer 51 in the present embodiment is provided in cloud server 50.

The other elements according to the present embodiment are the same as those in Embodiment 1 unless stated otherwise. The same elements are given the same reference numerals, and detailed descriptions thereof will be omitted.

As illustrated in FIG. 7, speech recognition device 10a includes communication unit 29 in addition to input unit 24, obtaining unit 21, storage 22, utterance start detector 23, and speaker identification unit 25.

Upon identifying one speaker as either the first speaker or the second speaker, speaker identification unit 25 outputs, to storage 22, result information including the result of the speaker identification.

Upon obtaining the result information, storage 22 outputs, to communication unit 29, speech information on the most recent speech of the identified speaker.

Communication unit 29 is a communication module capable of wireless or wired communication with, via a network, cloud server 50 which includes speech recognizer 51.

Communication unit 29 transmits, to cloud server 50, the speech of either the first speaker or at least one second speaker identified by speaker identification unit 25. Specifically, communication unit 29 obtains, from storage 22 via utterance start detector 23, speech information on the speech uttered at timing closest to the first timing by the speaker identified by speaker identification unit 25, and transmits the obtained speech information to cloud server 50 via the network.

Communication unit 29 receives a result of speech recognition that speech recognizer 51 included in cloud server 50 has performed on the speech from its start position. Specifically, communication unit 29 receives, from cloud server 50, the result of speech recognition performed on the speech of the first speaker or at least one second speaker, i.e., receives the first text or the second text which indicates the content of the speech of the first speaker or at least one second speaker. Communication unit 29 then outputs the received first text or second text to translation processor 32.

Note that speech translation apparatus 1 need not include translation processor 32; cloud server 50 may further include translation processor 32. In this case, speech recognition device 10a included in speech translation apparatus 1 may be communicatively connected to cloud server 50 via a network, and speech recognition device 10a may transmit, to cloud server 50, a speech of the first speaker or a speech of at least one second speaker. Speech translation apparatus 1 may receive: the first text and second text indicating the content of the speech; and a translation speech, output the received first text and second text to display 33, and output the received translation speech to speech output unit 34.

Advantageous Effects

Next, advantageous effects of speech recognition device 10a according to the present embodiment will be described.

As described above, speech recognition device 10a according to the present embodiment includes communication unit 29 configured to communicate with cloud server 50 which includes speech recognizer 51, and communication unit 29 transmits, to cloud server 50, the speech of the one of the first speaker and the at least one second speaker identified by speaker identification unit 25, and receives a result of the speech recognition that speech recognizer 51 included in cloud server 50 has performed on the speech from the start position of the speech.

Accordingly, since it is cloud server 50 that performs speech recognition on the speech of the first speaker and the speech of at least one second speaker, it is possible to reduce the processing load on speech recognition device 10a.

Moreover, the present embodiment yields the same advantageous effects as those yielded by Embodiment 1.

Variations, Etc.

The present disclosure has been described above based on Embodiments 1 and 2; however, the present disclosure is not limited to Embodiments 1, 2, etc.

For example, with the speech recognition device, speech recognition method, and recording medium according to Embodiments 1 and 2 described above, the speech recognition device may, with one push of the input unit at the start of translation, automatically perform: speech recognition on speeches of the first speaker and the second speaker; and translation of the recognized speeches.

Furthermore, with the speech recognition device, speech recognition method, and recording medium according to Embodiments 1 and 2 described above, the directions in which the first speaker and at least one second speaker are present with respect to the speech translation apparatus may be estimated based on speeches obtained by the obtaining unit. In this case, the direction in which the sound source is present with respect to the speech translation apparatus may be estimated based on a speech of the first speaker and a speech of at least one second speaker, using the obtaining unit which includes a microphone array. Specifically, the speech recognition device may calculate a time difference (phase difference) between speeches reaching different microphones of the obtaining unit, and estimate the direction in which the sound source is present, using a delay time estimation method, for example.

Furthermore, with the speech recognition device, speech recognition method, and recording medium according to Embodiments 1 and 2 described above, the speech recognition device need not be included in the speech translation apparatus. For example, the speech recognition device and the speech translation apparatus may be individual, independent devices. In this case, the speech recognition device may include a power source, and the speech translation apparatus may include a translation processor, a display, a speech output unit, and a power source.

Furthermore, with the speech recognition device, speech recognition method, and recording medium according to Embodiments 1 and 2 described above, a speech of the first speaker and at least one second speaker stored in the storage may be transmitted to the cloud server via the network and stored in the cloud server, or only the first text and second text obtained as a result of recognition of the speech may be transmitted to the cloud server via the network and stored in the cloud server. In such cases, the speech, the first text, the second text, etc. may be deleted from the storage.

Furthermore, with the speech recognition device, speech recognition method, and recording medium according to Embodiments 1 and 2 described above, when the speech recognition device, through the obtainment, by the obtaining unit, of a section in which a speaker utters a speech, detects a section of a predetermined period or longer in which the obtaining unit obtains no speech of any speakers, the speech recognition device may automatically cancel or stop recording.

Furthermore, the speech recognition methods according to Embodiments 1 and 2 described above may be implemented in the form of a program using a computer, and such a program may be stored in a storage device.

Each processing unit included in the speech recognition device, speech recognition method, and recording medium according to Embodiments 1 and 2 described above is achieved through large-scale integration (LSI), which is typically embodied as an integrated circuit. Each processing unit may be realized as a chip, or some or all of the processing units may be realized as a chip.

An integrated circuit need not be obtained through LSI, but may be a dedicated circuit or a general-purpose processor. A field-programmable gate array (FPGA) for which programming can be performed after an LSI circuit is fabricated or a reconfigurable processor capable of reconfiguring connections and settings of circuit cells of an LSI circuit may be used, instead.

Note that in Embodiments 1 and 2 described above, each component may be achieved by dedicated hardware or a software program suitable for each component. Each component may be achieved by a program execution unit such as a central processing unit (CPU) or a processor that reads and executes a software program recorded on a recoding medium such as a hard disk or a semiconductor memory, instead.

Numbers in the above description are examples used for specifically describing the present disclosure, and Embodiments 1 and 2 of the present disclosure are not limited by such numbers.

The block diagrams each illustrate one example of the division of functional blocks: a plurality of functional blocks may be implemented as a single functional block, a single functional block may be broken up into a plurality of functional blocks, and part of one function may be transferred to another functional block. Functions of a plurality of functional blocks having similar functions may be processed in parallel or by time-division by a single hardware or software product.

The orders of the steps illustrated in the flow charts are mere examples used for specifically describing the present disclosure, and the orders of the steps may be different from those described above. Some of the steps may be performed at the same time as (in parallel with) another step.

Apart from the above, the present disclosure also encompasses embodiments obtained by making various modifications to Embodiments 1 and 2 that are conceivable to a person skilled in the art, as well as embodiments implemented by arbitrarily combining components and functions in Embodiments 1 and 2 within the scope of the essence of the present disclosure.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The present disclosure is applicable to a speech recognition device, a speech recognition method, and a recording medium which facilitate communication, in the form of a conversation, among a plurality of speakers who speak different languages.

The invention claimed is:

1. A speech recognition device for a conversation between a first speaker and at least one second speaker who is a conversation partner of the first speaker, the speech recognition device comprising:
    an obtaining unit which obtains a speech uttered in the conversation between the first speaker and the at least one second speaker;
    a storage which stores the speech uttered in the conversation between the first speaker and the at least one second speaker and obtained by the obtaining unit;
    an input unit which receives operation input from at least the first speaker, the operation input serving as a trigger to perform speech recognition on each speech uttered in the conversation between the first speaker and the at least one second speaker;
    an utterance start detector which, in response to the operation input received by the input unit, detects a start position of the speech stored in the storage, the start position being a position at which utterance of the speech has started; and
    a speaker identification unit which identifies a speaker of the speech as one of the first speaker who has performed the operation input on the input unit and the at least one second speaker who has not performed the operation input on the input unit, based on first timing and second timing which are set for each of speeches uttered in the conversation between the first speaker and the at least one second speaker, the first timing being timing at which the input unit has received the operation input, the second timing being timing which indicates the start position of the speech detected by the utterance start detector, wherein
    speech recognition is performed on the speech uttered by the one of the first speaker and the at least one second speaker identified by the speaker identification unit, the speech recognition being performed by a speech recognizer from the start position of the speech, and
    the speaker identification unit:
    compares the first timing and the second timing which are set for each speech uttered in the conversation between the first speaker and the at least one second speaker;
    identifies the speaker of the speech as the first speaker from the first speaker and the at least one second speaker when the first timing is earlier than the second timing; and
    identifies the speaker of the speech as the at least one second speaker from the first speaker and the at least one second speaker when the second timing is earlier than the first timing.

2. The speech recognition device according to claim 1, wherein
    when the speaker of the speech is identified as the first speaker from the first speaker and the at least one second speaker, the speech recognizer performs the speech recognition on the speech of the first speaker, and when the speaker of the speech is identified as a second speaker from the first speaker and the at least one second speaker, the speech recognizer performs the speech recognition on the speech of the second speaker.

3. The speech recognition device according to claim 1, wherein the speaker identification unit identifies the speaker as one of the first speaker and the at least one second speaker, for each speech uttered in the conversation between the first speaker and the at least one second speaker in a specified period before or after the first timing at which the input unit has received the operation input.

4. The speech recognition device according to claim 1, wherein upon finish of the speech recognition on a speech of the first speaker who has performed the operation input on the input unit, the storage starts to store a speech obtained by the obtaining unit, to store a speech of the at least one second speaker.

5. The speech recognition device according to claim 1, comprising:

a communication unit configured to communicate with a cloud server which includes the speech recognizer, wherein the communication unit transmits, to the cloud server, the speech of the one of the first speaker and the at least one second speaker identified by the speaker identification unit, and receives a result of the speech recognition that the speech recognizer included in the cloud server has performed on the speech from the start position of the speech.

6. The speech recognition device according to claim 1, comprising:

the speech recognizer which performs the speech recognition on the speech of the one of the first speaker and the at least one second speaker identified by the speaker identification unit, the speech recognition being performed from the start position of the speech.

7. The speech recognition device according to claim 1, wherein the input unit is one operation button provided to the speech recognition device.

8. The speech recognition device according to claim 1, wherein the input unit receives the operation input from the first speaker for every speech of the first speaker and for every speech of the at least one second speaker.

9. A speech recognition method for a conversation between a first speaker and at least one second speaker who is a conversation partner of the first speaker, the speech recognition method comprising:

obtaining, using an obtaining unit, a speech uttered in the conversation between the first speaker and the at least one second speaker;

storing, in a storage, the speech uttered in the conversation between the first speaker and the at least one second speaker and obtained;

receiving, by an input unit, operation input from at least the first speaker, the operation input serving as a trigger to perform speech recognition on each speech uttered in the conversation between the first speaker and the at least one second speaker;

detecting, using an utterance start detector and in response to the operation input received by the input unit, a start position the speech stored in the storage, the start position being a position at which utterance of the speech has started;

identifying, using a speaker identification unit, a speaker of the speech as one of the first speaker who has performed the operation input on the input unit and the at least one second speaker who has not performed the operation input on the input unit, based on first timing and second timing which are set for each of speeches uttered in the conversation between the first speaker and the at least one second speaker, the first timing being timing at which the input unit has received the operation input, the second timing being timing which indicates the start position of the speech detected; and performing, using a speech recognizer, speech recognition on the speech of the one of the first speaker and the at least one second speaker identified, the speech recognition being performed from the start position of the speech, and in the speaker identification unit:

comparing the first timing and the second timing which are set for each speech uttered in the conversation between the first speaker and the at least one second speaker;

identifying the speaker of the speech as the first speaker from the first speaker and the at least one second speaker when the first timing is earlier than the second timing; and identifying the speaker of the speech as the at least one second speaker from the first speaker and the at least one second speaker when the second timing is earlier than the first timing.

10. A non-transitory computer-readable recording medium for use in a computer, the recording medium having a computer program recorded thereon for causing the computer to execute the speech recognition method according to claim 9.

* * * * *